United States Patent [19]

Schneider

[11] 3,980,923

[45] Sept. 14, 1976

[54] PHOTOGRAPHIC FLASH APPARATUS WITH MULTIPLE UNITS

[75] Inventor: Arthur Schneider, Volkenrode, Germany

[73] Assignee: Rollei-Werke Franke & Heidecke, Braunschweig, Germany

[22] Filed: Apr. 10, 1975

[21] Appl. No.: 566,682

[30] Foreign Application Priority Data

Apr. 11, 1974 Germany ............................ 2417673

[52] U.S. Cl. ............................ 315/241 P; 315/150; 354/132

[51] Int. Cl.[2] ..................... H05B 37/02; G03B 15/03

[58] Field of Search ................ 315/241 P, 150, 152, 315/156, 157; 250/214 SF

[56] References Cited

UNITED STATES PATENTS

| | | | |
|---|---|---|---|
| 3,156,827 | 11/1964 | Porteous et al. | 315/241 P |
| 3,288,044 | 11/1966 | Bramer | 315/241 P |
| 3,714,443 | 1/1973 | Ogawa | 315/241 P |
| 3,809,954 | 5/1974 | Engelstatter | 315/241 P |

*Primary Examiner*—Robert Segal
*Attorney, Agent, or Firm*—Stonebraker, Shepard & Stephens

[57] ABSTRACT

Photographic flash apparatus having one flash unit which may be called the main or master or primary flash unit, and one or more additional flash units which may be called secondary or slave or dependent units. Eliminating connecting cables often used in the prior art, and also eliminating ratio frequency controls sometimes used in the prior art relating to multiple units, the secondary or dependent units of the present invention are independently powered and are triggered to initiate a flash by the light from the flash of the main unit, and triggered to terminate or discontinue the flash in each dependent unit when the flash in the main unit turns off. The control of each secondary unit is entirely by means of the flash of light from the main unit. The apparatus is particularly useful in studio lighting where it is desired to illuminate the subject being photographed from a plurality of different directions.

9 Claims, 6 Drawing Figures

PHOTOGRAPHIC FLASH APPARATUS WITH MULTIPLE UNITS

BACKGROUND OF THE INVENTION

The invention relates to photographic flash apparatus, especially but not exclusively for photographic studios, the flash equipment having provisions for exposure measurement and automatic flash limitation. More particularly, the invention relates to equipment having a plurality of separate flash units, so that at the time of the photographic exposure, the subject being photographed (and its background) may be illuminated by light coming from two or more directions, each flash unit having an ignition and quenching device, there being exposure-measuring apparatus which measures the light reflected by the subject to the camera, and instigates the interruption or termination of the flash radiation when a determinable light value is reached.

In such a flash arrangement, the overall illumination impression of subject and background is detected by the exposure-measuring apparatus independently of the desired distribution of the individual light fluxes of the respective flash units, and the flash radiation can be broken off or terminated at any desired moment, according to the desired overall illumination detected by the exposure-measuring apparatus. It is essential here that all flash units should light up and extinguish simultaneously without time delay or with no substantial time delay. Thus it is insured that the light distribution desired on the subject, which can be produced by differently selected positions of the individual flash units, are correctly reproduced in the exposure.

A known flash arrangement of this kind comprises an exposure-measuring and flash-limiting apparatus fitted close to the camera, which apparatus is connected with the synchronous switch of the camera shutter and controls the simultaneous ignition of all flash tubes and the simultaneous tripping of all extinguishing arrangements in the connected independent electronic flash units. The individual flash units are connected with one another with the exposure-measure and flash-limiting apparatus by two-core cables.

Since the laying of cables is extremely hindering in studio operation, in a further known flash arrangement of the initially stated kind the simultaneous ignition and extinguishing of all electronic flash units are effected by an exposure-measuring and flash-limiting apparatus which radio-controls the ignition and extinguishing devices of the individual electronic flash units through remote control transmitters and remote control receivers. Such remote control transmitters and receivers however are very expensive and hardly find acceptance in flash arrangements for simple studio installations, on account of their high costs.

The invention is therefore based upon the problem of producing a flash arrangement of the initially stated kind in which the ignition and extinguishing of the individual electronic flash units take place without connecting cables, on the one hand, and on the other hand no particular remote control transmitter is required, and the technical expense of which is substantially reduced in comparison with the known flash arrangements.

SUMMARY OF THE INVENTION

According to the present invention the problem is solved in that the ignition device of a selected electronic flash unit which may be called the master unit or primary unit or main unit is connected with the synchronous contact of the camera, and the extinguishing device of the selected electronic flash unit is connected to the exposure-measuring apparatus, while the ignition and extinguishing devices of the other electronic flash units (which may be called secondary or slave or supplementary units) are actuatable by means of signals which are derived from the light flux radiated by the selected flash unit.

In this case the other or supplementary electronic flash units advantageously each have a photo-electric measuring device which converts the speed of rise of the light flux issued by the selected or primary electronic flash unit in the ignition of the selected electronic flash unit into a signal for actuating the ignition device in the supplementary unit, and converts the speed of fall off of the light flux from the primary unit, when the primary flash is extinguished, into a signal for actuating the extinguishing device of the respective secondary or supplementary electronic flash unit.

In expedient development of the invention, the photo-electric measuring apparatus comprises of a photo-transistor the collector-emitter path of which lies, in series with a resistor or inductance connected to the emitter, at a feed voltage, and the emitter of which photo-transistor is connected through a first capacitor with the ignition device and through a second capacitor with the extinguishing device of the respective electronic flash unit.

In accordance with a further proposal in accordance with the invention, if the exposure-measuring apparatus of the flash arrangement is installed in the selected or primary electronic flash unit, an ordinary commercial so-called computer flash unit can be used as the selected electronic flash unit. It is advantageous here if the computer or the exposure-measuring device comprises a photo-electric measuring member spatially separable from the unit and this is fitted close to the camera. The exposure-measuring device then measures the overall illumination of the subject, as it is also detected by the camera, and an exact exposure of the photographic image in accordance with the light distribution prevailing on the subject is guaranteed.

DESCRIPTION OF THE PREFERRED EMBODIMENTS

Figure 1:
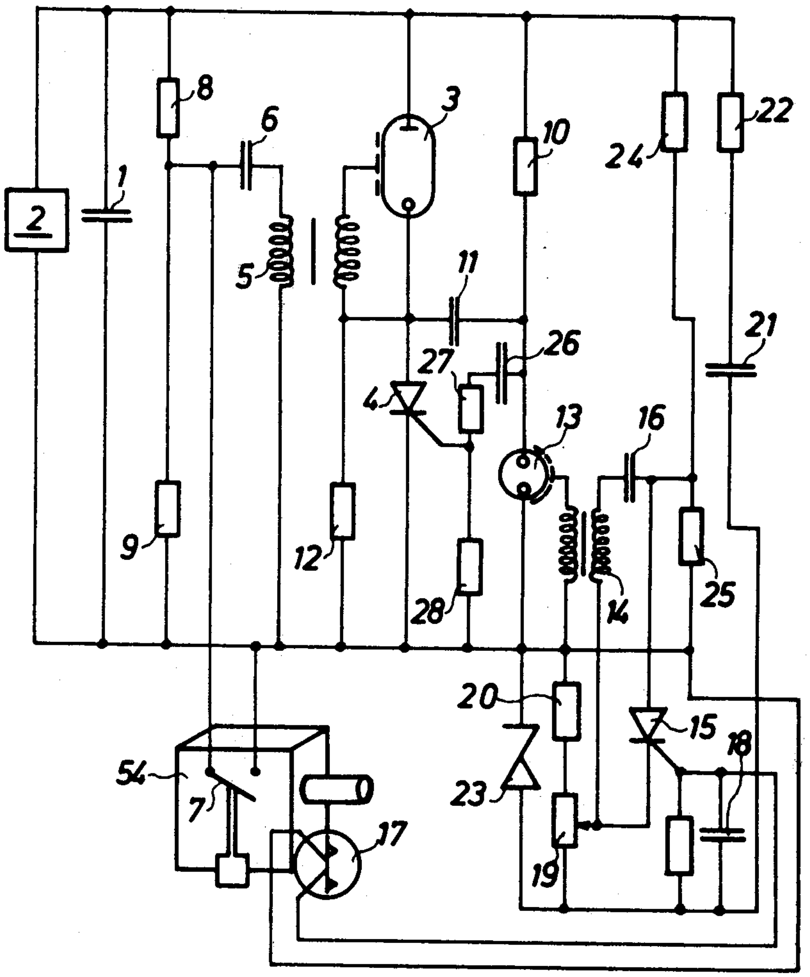
FIG. 1 is a circuit diagram for the selected or main electronic flash unit with built-in exposure-measuring device, according to a preferred embodiment of the invention.

In FIG. 1 a storage capacitor 1 can be charged up from any convenient direct-current voltage source, for example a voltage transformer 2. The series connection of a flash tube 3 and a switch thyristor 4 lies parallel with the storage capacitor 1. The ignition device for the switch tube 3 comprises an ignition transformer 5, the secondary winding of which is connected with the ignition electrode of the flash tube 3 and the primary winding of which is in series with an ignition capacitor 6 and a swich 7 (synchronous contact) arranged in the camera schematically shown at 54 and closing when the shutter of the camera is in the open position. The ignition capacitor 6 is chargeable through a voltage divider circuit comprising the resistors 8 and 9 arranged parallel to the main capacitor 1. The series-connection of a resistor 10 and a capacitor 11 is connected in parallel with the flash tube 3, while a resistor 12 is in parallel with the switch thyristor 4. The connection point between resistor 10 and capacitor 11 is connected through a thyratron 13 to the zero potential of the circuit. The series-connection of a capacitor 26 and resistors 27 and 28 is connected in parallel with the thyratron 13. The connection point between the resistors 27 and 28 is connected with the control electrode or gate of the switch thyristor 4.

The thyratron 13 is turned on by an exposure-measuring device when a settable value of the light quantity reflected by the subject is reached. For this purpose its ignition electrode is connected with the secondary winding of an ignition transformer 14, the primary winding of which lies together with a thyristor 15 in the discharge circuit of a capacitor 16. The control electrode or gate of the thyristor 15 is connected to the connection point of the series connection of a photo-transistor 17 and an integrating capacitor 18. The cathode of the thyristor 15 is additionally connected to the adjustable tap of a potentiometer 19 which is connected, in series with a resistor 20, parallel with the series-connection of the photo-transistor 17 and the capacitor 18. The current supply of the measuring device takes place, during the flash radiation of the flash tube 3, by discharge of a feed capacitor 21 through the resistor 22, the flash tube 3, the switch thyristor 4, and the resistors 20 and 19. In order to achieve a constant voltage a Zener diode 23 is connected in parallel with the resistors 20 and 19. The capacitor 16 is chargeable through a voltage divider circuit comprising the resistors 24 and 25.

Figure 2:
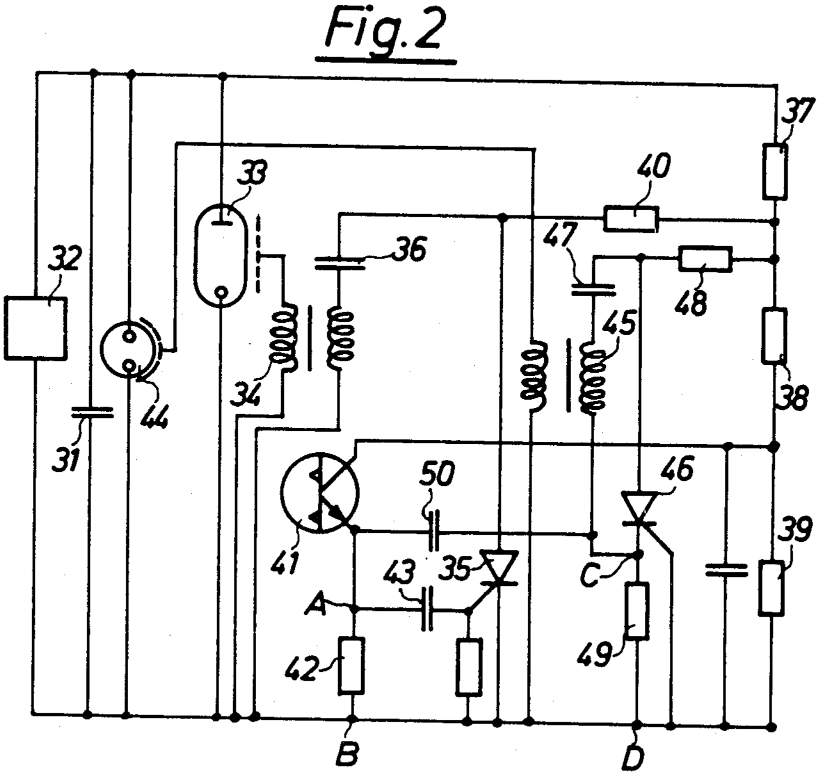
FIG. 2 is a circuit diagram of the other or supplementary electronic flash units.

In FIG. 2 there is illustrated the circuit diagram of one of the secondary or slave flash units, there being as many of these further electronic flash units as desired. As in FIG. 1, here a storage capacitor 31 is charged up through a suitable conventional source of direct current, such as voltage transformer 32. The flash tube 33 is connected in parallel with the storage capacitor. Its ignition electrode is connected with the secondary winding of an ignition transformer 34, the primary winding of which lies together with a thyristor 35 in the discharge circuit of an ignition capacitor 36. The capacitor 36 is chargeable through the resistors 37 and 40 to a partial voltage corresponding to the division ratio of a voltage divider circuit 37, 38, and 39 connected in parallel with the storage capacitor 31.

Figure 4:
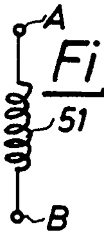
FIG. 4 illustrates a circuit element which can be connected between the terminals A-B in place of the circuit elements in FIG. 2.

The series-connection of a photo-transistor 41 and a resistor 42 is connected in parallel with the resistor 39. In place of the resistor 42 an inductance 51 according to FIG. 4 can also be connected between the emitter of the photo-transistor and the zero potential line, that is between the connection points A and B. The connection point between the emitter of the photo-transistor and the resistor 42 is also connected through a first capacitor 43 with the control electrode or gate of the thyristor 35.

Figure 5:
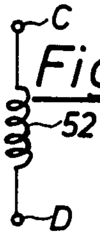
FIGS. 5 and 6 each show a circuit element which can be connected between the terminals C-D in place of the circuit element in FIG. 2.
Figure 6:
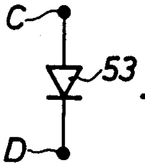

The extinguishing device of the electronic flash unit comprises a thyratron 44 connected in parallel with the storage capacitor. The ignition electrode of this thyratron 44 is connected with the secondary winding of a second ignition transformer 45. The primary winding of this second ignition transformer 45 lies together with a thyristor 46 in the discharge circuit of a second ignition capacitor 47. The capacitor 47 is chargeable through the resistors 37 and 48 to a partial voltage corresponding to the divider ratio of the voltage divider circuit 37, 38, and 39. The cathode of the thyristor 46 is further connected through a resistor 49 with the zero potential of the circuit arrangement. The control electrode of the thyristor 46 is likewise at zero potential. An inductance 52 (FIG. 5) or a diode 53 (FIG. 6) can also be connected in place of the resistor 49, between the cathode of the thyristor 46 and zero potential, that is between the connection points C and D.

The manner of operation of the flash arrangement according to FIG. 1 (the primary unit) and FIG. 2 (the secondary unit) is as follows:

The main flash unit according to FIG. 1 and the supplementary flash unit or units according to FIG. 2 are directed in any desired position according to the desired light distribution upon the subject to be photographed and the background. The photo-transistor 17 in the exposure-measuring device is formed as an external sensor and is preferably arranged directly on the camera. In the condition ready for flashing the storage capacitors 11 and 31 are charged to working voltage, and the capacitors 6, 16, 36, and 47 are charged to a corresponding partial voltage.

On actuation of the camera trigger or release, with the shutter in the open position the switch contact 7 is closed and the capacitor 6 discharges through the primary winding of the ignition transformer 5. The discharge current of the capacitor 6 through the primary winding of the ignition transformer 5 induces a current surge in the secondary winding which ignites the flash tube. Thus the potential at the anode of the switch thyristor 4 rises suddenly. This potential jump is transmitted through the capacitors 11 and 26 and causes a voltage drop on the resistor 28 which is greater than the ignition voltage of the switch thyristor 4, so that the latter switches through or becomes conductive. The flash tube 3 emits a light flux which has the time course reproduced in FIG. 3. This light flux arrives directly, or by way of reflection from the subject or the background, upon the photo-transistor 41 of each of the electronic flash units according to FIG. 2 and here causes a current flux through the photo-transistor 41 and the resistor 42.

The voltage variation on the resistor 42 passes by way of the capacitor 43 to the control electrode of the thyristor 35 and ignites the latter, i.e. makes it conductive. Thus the capacitor 36 discharges through the switched-through thyristor 35 and the primary winding of the ignition transformer 34. The discharge current induces a current pulse in the secondary winding of the ignition transformer 34 which ignites the flash tube 33 through the ignition electrode, so that this tube emits a light flux. The delay with which the electronic flash unit or units according to FIG. 2 ignites after the selected or main electronic flash unit in FIG. 1 is negligible.

The light emitted by all of the electronic flash units together is reflected by the subject and the background, and a part of the reflected light arrives on the sensor in the form of the photo-transistor 17 fitted close to or on the camera. According to the intensity of the light flux a more or less great current will flow through the photo-transistor 17, which current in a specific time interval charges up the integrating capacitor 18 to a predeterminable voltage. If this voltage is achieved before the capacitor 1 is completely discharged the thyristor 15 ignites through (i.e., becomes conductive) and the capacitor 16 can discharge itself through the conductive thyristor 15 and the primary winding of the ignition transformer 14. The charge current in the primary winding induces an ignition pulse in the secondary winding of the ignition transformer 14 for the ignition of the thyratron 13. When the thyratron becomes conductive the capacitor 11 and the capacitor 26 discharge themselves, so that the thyristor 4 is blocked in known manner. Thus the discharge circuit of the storage capacity 1 is interrupted and the flash radiation of the flash tube 3 is terminated and breaks off suddently as shown in FIG. 3 at the time moment $t_1$.

The disappearance of the light flux emitted by the selected or primary electronic flash unit in FIG. 1 is recorded in each of the secondary units by the photo-electric measuring device, comprising the photo-transistor 41, in such manner that the current flowing through the phototransistor as a result of its illumination suddenly drops. Thus the voltage on the resistor 42 collapses and the speed of variation of this voltage passes by way of the capacitor 50 to the cathode of the thyristor 46. Thus the cathode is briefly connected to a potential which lies lower, by at least the ignition voltage of the thyristor 46, than the zero potential of the control electrode of the thyristor 46. Thus the thyristor 46 ignites through (becomes conductive) and the second ignition capacitor 47 can discharge itself through the switched-through thyristor 46 and the primary winding of the second ignition transformer 45. The discharge current in the primary winding induces an ignition pulse in the secondary winding of the ignition transformer which ignites the thyratron 44 through its ignition electrode. The switched-through or conductive thyratron 44 takes over the discharge current of the storage capacitor 31 so that the flash tube 33 is de-energized and the flash radiation of the electronic flash units is terminated.

Figure 3:
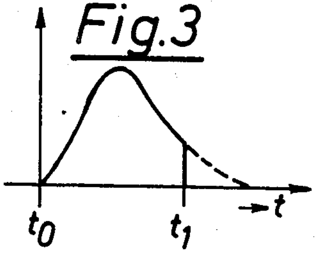
FIG. 3 is a time diagram of the light flux radiated by the main electronic flash unit, the electronic flash unit being ignited at the moment $t_0$ and extinguished at the moment $t_1$.

As appears from the description, thus the rising flank of the light flux radiation according to FIG. 3 by the selected main or primary electronic flash unit according to FIG. 1 is used to ignite the other supplementary or secondary electronic flash units, and from the sudden drop-off of the light flux on extinguishing of the main electronic flash unit according to FIG. 1, a signal is formed in the other or supplementary electronic flash unit or units for the actuation of the respective extinguishing devices.

The other electronic flash units, like the selected electronic flash unit according to FIG. 1, can comprise, in place of the thyratron 44 short-circuiting the storage capacitor 31, a series connection of flash tube and switch thyristor, a similar extinguishing device being associated with the switch thyristor as with the switch thyristor 4 in FIG. 1.

It may be noted that each secondary or supplementary flash unit has its own separate and independent power source 32, and that the signals given to the secondary units are derived from the light emitted by the primary unit, which would be emitted anyhow whether any secondary unit is present or not. Thus there is no additional strain or drain on the primary unit, no matter how many or how few secondary units are employed. Without the trouble of connecting cords or cables, and without the expense of radio transmitters and receivers, this invention enables a photographic studio to light the subject to be photographed and the background from as many different directions and using as many different light sources as desired, all operating concomitantly or substantially simultaneously with only negligible time delay, and all having flashes which are terminated at an appropriate time to avoid over-exposure.

What is claimed is:

1. Photographic flash apparatus comprising a first flash unit, said first unit having means for producing a flash of light, a synchronous contact switch, means responsive to operation of said synchronous contact switch for initiating said flash of light, means for measuring and integrating light reflected from a subject being photographed, and means responsive to said measuring and integrating means for terminating said flash of light; and a second flash unit separate and distinct from said first flash unit, said second flash unit having means for producing a flash or light, for initiating said flash of light from said second unit, and means for terminating said flash of light from said second unit, said initiating means and terminating means being responsive to signals derived from light flux radiated by said first flash unit.

2. The invention defined in claim 1, wherein said second flash unit includes photo-electric light measuring means converting the speed of rise of light flux emanating from said first unit into a signal for operating said initiating means of said second unit and converting the speed of decrease of light flux emanating from said first unit into a signal for operating said terminating means of said second unit.

3. The invention defined in claim 2, wherein said photo-electric light measuring means comprises an impedance, a photo-transistor (41) having a collector-emitter path connected in series with said impedance and with a feed voltage source, a first capacitor (43), a second capacitor (50), a circuit connection from the emitter of said photo-transistor through said first capacitor to a portion (35) of said flash initiating means of said second unit, and a circuit connection from the emitter of said photo-transistor through said second capacitor to a portion (45, 46) of said flash terminating means of said second unit.

4. The invention defined in claim 3, wherein said impedance is a resistor (42).

5. The invention defined in claim 3, wherein said impedance is an inductance (51).

6. The invention defined in claim 3, wherein said flash initiating means of said second flash unit comprises a chargeable capacitor (36), a pulse transformer (34) having a primary winding, and a thyristor (35) having an anode-cathode path connected in series with said chargeable capacitor and said primary winding, said thyristor having a control electrode connected through said first capacitor (43) to said emitter of said photo-transistor (41).

7. The invention defined in claim 3, wherein said flash terminating means of said second flash unit comprises a chargeable capacitor (47), a pulse transformer (45) having a primary winding, and a thyristor (46) having an anode-cathode path connected in series with said chargeable capacitor and said primary winding, said thyristor having a control electrode connected to zero potential and having its cathode connected through said second capacitor (50) to said emitter of said photo-transistor (41), said cathode of said thyristor also being connected to zero potential through a circuit element constituting one of the group consisting of a resistor (49), an inductance (52), and a diode (53).

8. The invention defined in claim 1, wherein said first flash unit means for producing a flash of light includes a flash tube, and wherein said means for measuring and integrating light is installed partly in said first flash unit and includes a photo-electric measuring element (17) physically located at a substantial distance from said flash tube and adapted to be mounted on a photographic camera (54).

9. A photographic flash unit comprising a storage capacitor, a source of current for charging said capacitor, a flash tube connected to said capacitor and adapted to produce a flash of light upon discharge of a charge from said capacitor through said tube, means for initiating a flash of light from said tube in response to a sudden rise of light flux falling on said flash unit from a source external to said unit, and means for terminating said flash of light in response to a sudden decrease in light flux falling on said flash unit from said external source, so that said flash unit may be used as a supplementary flash unit to produce an additional light flash starting concomitantly with the start of another light flash of variable length produced by another flash source and terminating concomitantly with the termination of such other light flash.

* * * * *